(12) United States Patent
Naserian et al.

(10) Patent No.: US 11,104,340 B2
(45) Date of Patent: Aug. 31, 2021

(54) METHODS TO ENHANCE POWERTRAIN SYSTEMS EQUIPPED WITH TURBOCHARGER OR REGENERATIVE BRAKING SYSTEM

(71) Applicant: GM Global Technology Operations LLC, Detroit, MI (US)

(72) Inventors: Mohammad Naserian, Windsor (CA); Allan K. Lewis, Windsor (CA); Donald K. Grimm, Utica, MI (US); Yiran Hu, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 429 days.

(21) Appl. No.: 16/190,719

(22) Filed: Nov. 14, 2018

(65) Prior Publication Data
US 2020/0148210 A1    May 14, 2020

(51) Int. Cl.
*B60W 10/08* (2006.01)
*B60W 30/18* (2012.01)
(Continued)

(52) U.S. Cl.
CPC ......... *B60W 30/18154* (2013.01); *B60L 7/18* (2013.01); *B60W 10/06* (2013.01);
(Continued)

(58) Field of Classification Search
CPC .......... F02D 23/00; F02D 23/02; F02D 37/02; F02D 41/0007; B60W 10/06;
(Continued)

(56) References Cited

U.S. PATENT DOCUMENTS 9,284,920 B2\*  3/2016  Leone ................. F02M 26/43
10,486,677 B2\* 11/2019  Ito ..................... F02D 41/107
(Continued)

OTHER PUBLICATIONS

Lyapunov-stability for the sliding-mode control of a turbocharger subject to state constraints; Jan Schreibeis;Kai Wulff;Johann Reger;Jaime A. Moreno; IECON 2017—43rd Annual Conference of the IEEE Industrial Electronics Society; IEEE Conference Paper. (Year: 2017).\*

(Continued)

*Primary Examiner* — Cuong H Nguyen
(74) *Attorney, Agent, or Firm* — Quinn IP Law

(57) ABSTRACT

A host vehicle includes an internal combustion engine, a turbocharger in fluid communication with the internal combustion engine, a communication system configured to transmit and receive a traffic-related message, and a controller in communication with the turbocharger and the communication system. The controller is programmed to: receive the traffic-related message via the communication system; and command the internal combustion engine to increase a power output to spool up the turbocharger in response to receiving the traffic-related message. The controller is programmed to determine a number of relevant vehicles. The number of relevant vehicles is a number of vehicles that are in front of the host vehicle and behind a traffic light and affect a movement of the host vehicle toward the traffic light. The traffic-related message is a one of a vehicle message from another vehicle and/or a traffic-light message from the traffic light.

18 Claims, 6 Drawing Sheets

(51) Int. Cl.
*B60W 20/14* (2016.01)
*B60L 7/18* (2006.01)
*F02B 37/20* (2006.01)
*F02B 37/04* (2006.01)
*F02B 37/14* (2006.01)
*B60W 10/06* (2006.01)
*B60K 6/40* (2007.10)

(52) U.S. Cl.
CPC ............ *B60W 10/08* (2013.01); *B60W 20/14* (2016.01); *B60W 30/18127* (2013.01); *F02B 37/04* (2013.01); *F02B 37/14* (2013.01); *F02B 37/20* (2013.01); *B60K 6/40* (2013.01); *B60W 2420/42* (2013.01); *B60W 2520/04* (2013.01); *B60W 2520/10* (2013.01); *B60W 2554/804* (2020.02); *B60W 2555/60* (2020.02); *B60W 2556/45* (2020.02); *B60W 2710/0638* (2013.01); *B60W 2710/0677* (2013.01); *B60W 2710/08* (2013.01); *B60Y 2200/92* (2013.01); *B60Y 2300/18125* (2013.01)

(58) Field of Classification Search
CPC ......... B60W 10/08; B60W 2710/0638; B60W 20/14; B60W 30/18145; B60Y 2400/435; B60Y 2200/92; B60Y 2300/18125; B60L 7/20; B60L 7/22; B60L 7/18
USPC .......................................................... 701/22
See application file for complete search history.

(56) References Cited

U.S. PATENT DOCUMENTS

| | | | | |
|---|---|---|---|---|
| 2002/0082767 A1* | 6/2002 | Mintz | ................. | G08G 1/0133 701/117 |
| 2008/0219866 A1* | 9/2008 | Kwong | ................. | F02D 23/00 417/410.1 |
| 2015/0203091 A1* | 7/2015 | Wang | .................... | B60W 10/06 701/22 |
| 2015/0369180 A1* | 12/2015 | Leone | .................... | F02D 13/06 123/52.1 |
| 2016/0167519 A1* | 6/2016 | Luke | ......................... | B60L 7/18 701/22 |
| 2017/0028837 A1* | 2/2017 | Welschoff | ............... | B60L 58/12 |
| 2018/0043896 A1* | 2/2018 | Lee | ....................... | B60W 10/06 |
| 2018/0072297 A1* | 3/2018 | Ito | ....................... | F02D 41/1454 |
| 2019/0232942 A1* | 8/2019 | Liu | ....................... | B60W 20/19 |
| 2019/0276045 A1* | 9/2019 | Chow | ............... | B60W 30/1882 |
| 2019/0285017 A1* | 9/2019 | Dudar | .................... | F02B 37/18 |
| 2019/0344774 A1* | 11/2019 | Pursifull | ............... | B60W 10/08 |

OTHER PUBLICATIONS

Electrification of turbocharger and supercharger for downsized internal combustion engines and hybrid electric vehicles—benefits and challenges; Woongkul Lee et al.; 2016 IEEE Transportation Electrification Conference and Expo (ITEC); IEEE Conference Paper. (Year: 2016).*

Cruise control of a heavy duty truck on open road the benchmark problem; S. A. Adnan;A. I. Bhatti; 2017 11th Asian Control Conference (ASCC); IEEE Conference Paper. (Year: 2017).*

Energy balance assessment on vehicles with electrically assisted internal combustion engines; S. De Caro;C. Scaffidi;T. Scimone;A. Testa; 2015 International Conference on Clean Electrical Power (ICCEP); IEEE Conference Paper. (Year: 2015).*

Electrification of turbocharger and supercharger for downsized internal combustion engines and hybrid electric vehicles-benefits and challenges; Woongkul Lee etal; 2016 IEEE Transportation Electrification Conference and Expo (ITEC); Conference Paper; IEEE Transportation Electrification Conference; (Year: 2016).*

Carlos Guardiola et al "On the potential of traffic light information availability for reducing fuel consumption . . . "; Institution of Mechanical Engineers, Jour Automobile Engineering 2020, vol. 234(4) 981-991 (Year: 2020).*

* cited by examiner

METHODS TO ENHANCE POWERTRAIN SYSTEMS EQUIPPED WITH TURBOCHARGER OR REGENERATIVE BRAKING SYSTEM

INTRODUCTION

The present disclosure generally relates to vehicles, and more particularly, to a vehicle including a powertrain and a method for enhancing the powertrain equipped with a turbocharger and/or a regenerative braking system.

Internal combustion engines are often called upon to generate considerable levels of power for prolonged periods of time on a dependable basis. Many such internal combustion engine (ICE) assemblies employ a supercharging device, such as an exhaust gas turbine driven turbocharger, to compress the airflow before it enters the intake manifold of the engine in order to increase power and efficiency. Specifically, a turbocharger is a centrifugal gas compressor that forces more air and, thus, more oxygen into the combustion chambers of the internal combustion engine than is otherwise achievable with ambient atmospheric pressure. The additional mass of oxygen-containing air that is forced into the ICE improves the engine's volumetric efficiency, allowing it to burn more fuel in a given cycle, and thereby produce more power.

Vehicles include braking systems for reducing vehicle speed or bringing the vehicle to a stop. Regenerative braking causes the electric motor in the electric hybrid vehicle to operate as a generator to convert rotational energy from the vehicle wheels to electrical power that is used to charge the battery.

SUMMARY

The present disclosure describes a method for enhancing a powertrain of a host vehicle that is equipped with a turbocharger and/or a regenerative braking system. The vehicle sensing capabilities are used to provide situational awareness for turbocharger and regenerative braking systems. Under a variety of driving scenarios, perception and/or V2X information may be used to prepare the vehicle control system for upcoming conditions to improve engine response or maximize battery efficiency. Specifically, the present disclosure describes the use of vehicle perception information to estimate the situation in front of the vehicle (e.g., vehicles that are slowing down or beginning to move away) to reduce the turbo lag. The method enables turbocharging or regenerative braking control for the following types of driving scenarios: general end-of-queue approach and take off; traffic signal approach and take off; traffic signs (speed limits, advisory speeds, etc.); road anomalies (construction zones, potholes, etc.); pedestrians in or near the roadway. The disclosed control management strategy maximizes throttle response (turbo spool up) or energy conservation (regeneration) under a variety of driving scenarios, including: vehicle is approaching end of traffic queue (decelerating); vehicle is resuming from slow or stop (accelerating); traffic light is red with no traffic queue; traffic light is green with no traffic queue; traffic light is red with traffic queue; traffic light is green with traffic queue; obstacle (pothole, work zone, weather condition, etc.) is detected in the path of the host vehicle; school zone, speed limit change, curve advisory, etc. is detected based on camera or map; and pedestrian, cyclist, construction worker, etc. is detected in the path of the host vehicle via sensors or V2X device carried by the vulnerable road user. The presently disclosed method may also be used in upshift scenarios (e.g., vehicle ahead changes lanes—lanes open; cross traffic clears; lead vehicle acceleration; merging lanes; and lane change request with other vehicle in blind zone) and downshift scenarios (e.g., lead vehicle deceleration) The present disclosure also describes an artificial intelligence queue length estimation process.

The presently disclosed host vehicle includes an internal combustion engine, a turbocharger in fluid communication with the internal combustion engine, a communication system configured to transmit and receive a traffic-related message, and a controller in communication with the turbocharger and the communication system. The controller is programmed to: receive the traffic-related message via the communication system; and command the internal combustion engine to increase its power output to spool up the turbocharger in response to receiving the traffic-related message. Alternatively, in the case of an electrically assisted turbocharger, the turbocharger is spooled by spinning an electric machine attached to the turbocharger. The controller is programmed to determine a number of relevant vehicles. The number of relevant vehicles is a number of vehicles that are in front of the host vehicle and behind a traffic light and affect a movement of the host vehicle toward the traffic light. The traffic-related message is a one of a vehicle message from another vehicle (i.e., a first one of the relevant vehicles) and a traffic-light message from the traffic light.

The controller may be programmed to determine that the number of relevant vehicles is greater than zero and that the traffic-light message has been received from the traffic light. The controller may be programmed to determine that a first relevant vehicle is moving based on the vehicle message, and the first relevant vehicle is immediately in front of the host vehicle. The controller may be programmed to command the internal combustion engine to increase an output power to spool up the turbocharger in response to determining that the first relevant vehicle is moving based on the vehicle message. The controller may be programmed to detect the traffic light based on the traffic-light message and to determine the number of relevant vehicles is zero, and the controller is programmed to determine that a traffic-light state of the traffic light is red based on the traffic-light message. In response to determining that the traffic-light state of the traffic light is red, the controller may be programmed to: determine that the host vehicle is stationary and determine that a traffic-light transition time to green is less than a predetermined time threshold. The traffic-light transition time to green is an amount of time until the traffic-light state changes from red to green. In response to determining that the host vehicle is stationary and that the traffic-light transition time to green is less than the predetermined time threshold, the controller is programmed to command the internal combustion engine to increase a power output to spool up the turbocharger.

In response to determining that the traffic-light state of the traffic light is red, the controller may be programmed to determine that the host vehicle is not stationary and determine that a traffic-light transition time to green is equal to or greater than a predetermined time threshold. The traffic-light transition time to green is an amount of time until the traffic-light state changes from red to green. In response to determining that the host vehicle is not stationary and that the traffic-light transition time to green is equal to or greater than the predetermined time threshold, the controller is programmed to determine that a current vehicle speed of the host vehicle is less than a predetermined speed threshold determine that a traffic-light transition time to green is greater than a separation time. The traffic-light transition time to green is an amount of time until the traffic-light state changes from red to green. The separation time is an amount of time that the host vehicle will take, at the current vehicle speed, to reach an intersection in which the traffic light is located. In response to determining that the current vehicle speed of the host vehicle is less than the predetermined speed threshold and determining that the traffic-light transition time to green is greater than the separation time, the controller is programmed to command the internal combustion engine to increase a power output to spool up the turbocharger.

The controller is programmed to detect the traffic light based on the traffic-light message and to determine the number of relevant vehicles is zero. The controller is programmed to determine that a traffic-light state of the traffic light is green based on the traffic-light message. In response to determining that the traffic-light state of the traffic light is green, the controller is programmed to determine that a current vehicle speed of the host vehicle is greater than a predetermined speed threshold and determine that a traffic-light transition time to red is greater than a separation time. The traffic-light transition time to red is an amount of time until the traffic-light state of the traffic light changes from green to red. The separation time is an amount of time that the host vehicle will take, at the current vehicle speed, to reach an intersection in which the traffic light is located.

The host vehicle further includes an electric machine, a regenerative braking system coupled to the electric machine, and an energy storage system electrically connected to the electric machine. In response to determining that the current vehicle speed of the host vehicle is greater than the predetermined speed threshold and that the traffic-light transition time is greater than the separation time, the controller is programmed to actuate the regenerative braking system to electrically charge the energy storage system.

The controller is programmed to determine that a traffic-light state of the traffic light is green. In response to determining that the traffic-light state of the traffic light is green, the controller is programmed to determine that a current vehicle speed of the host vehicle is less than a predetermined speed threshold and determine that a traffic-light transition time is less than a separation time. The traffic-light transition time is an amount of time until the traffic-light state changes from red to green. The separation time is an amount of time that the host vehicle will take to reach an intersection in which the traffic light is located at the current vehicle speed. In response to determining that the current vehicle speed of the host vehicle is less than the predetermined speed threshold and that the traffic-light transition time is less than the separation time, the controller is programmed to command the internal combustion engine to increase a power output to spool up the turbocharger.

The host vehicle further includes a forward camera module configured to capture images and generate image data. The forward camera module is in communication with the controller. The controller is programmed to determine that a lane ends based on the image data received from the forward camera module. In response to determining that the lane ends, the controller commands the internal combustion engine to increase a power output to spool up the turbocharger. The controller may also be programmed to estimate a traffic queue length using artificial intelligence.

In one aspect of the present disclosure, the host vehicle includes an electric machine, an energy storage system electrically connected to the electric machine, a regenerative braking system electrically connected to the electric machine, a communication system configured to transmit and receive a traffic-related message, and a controller in communication with the communication system. The controller may be programmed to receive the traffic-related message via the communication system. In response to receiving the traffic-related message, the controller controls the regenerative braking system to electrically charge the energy storage system. The controller may be programmed to detect a traffic stop based on the traffic-related message, calculate a regeneration energy to be produced by the regenerative braking system based on a vehicle speed of the host vehicle and a vehicle mass of the host vehicle, and determine that the energy storage system does not have the capacity to receive the regenerative energy. In response to determining that the energy storage system does not have the capacity to receive the regeneration energy, the controller commands the energy storage system to supply electrical energy to the electric machine to propel the host vehicle. After supplying electrical energy from the energy storage system to the electric machine, the controller commands the regenerative braking system to supply electrical energy to the energy storage system.

The energy storage system has a maximum energy capacity taking into consideration a state of charge of the energy storage system. The energy storage system may supply electrical energy to the electric machine until the maximum energy storage capacity is equal to or greater than the regeneration energy. The controller commands the regenerative braking system to supply electrical energy to the energy storage system after the maximum energy capacity is equal to or greater than the regeneration energy.

The present disclosure also describes a method including: receiving, by a controller of a host vehicle, a traffic-related message; determining, by the controller, a number of relevant vehicles, wherein the number of relevant vehicles is a number of vehicles that are in front of the host vehicle and behind a traffic light and affect a movement of the host vehicle toward the traffic light; determining, by the controller, that the number of relevant vehicles is greater than zero; determining, by the controller, that the traffic-related message has been received from the traffic light; determining that a first relevant vehicle is moving based on a vehicle message from the first relevant vehicle, wherein the first relevant vehicle is immediately in front of the host vehicle; and commanding, by the controller, a command an internal combustion engine of the host vehicle to increase a power output to spool up the turbocharger in response to determining that the first relevant vehicle is moving.

The above features and advantages and other features and advantages of the present teachings are readily apparent from the following detailed description of the best modes for carrying out the teachings when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein is merely exemplary embodiments of the present disclosure.

Figure 1:
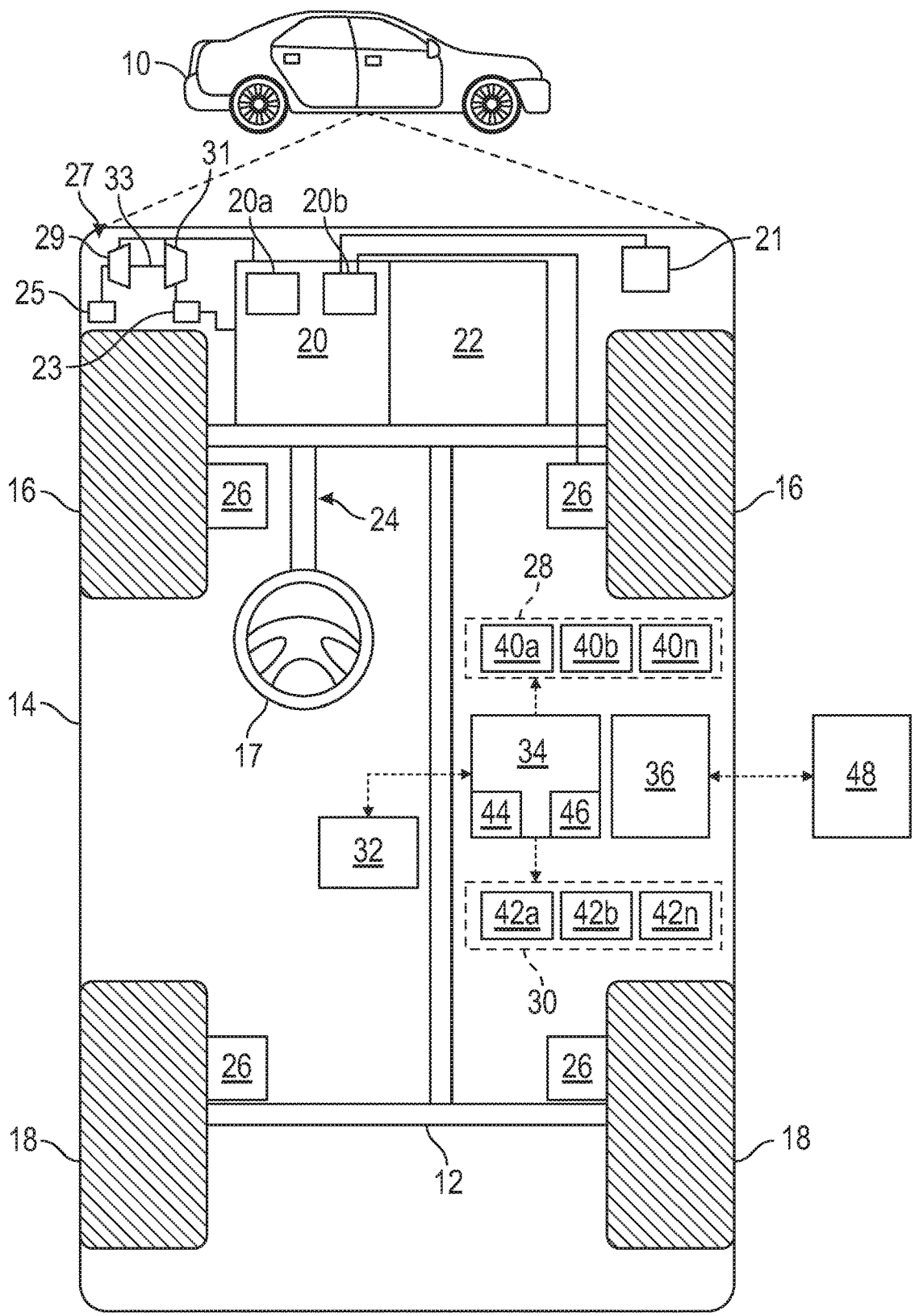
FIG. 1 is a functional block diagram illustrating a host vehicle.

With reference to FIG. 1, a host vehicle 10 includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near a respective corner of the body 14. The host vehicle 10 is, for example, a vehicle that is automatically controlled to carry passengers from one location to another. The host vehicle 10 is depicted in the illustrated embodiment as a passenger car, but it should be appreciated that other vehicle, including motorcycles, trucks, sport utility vehicles (SUVs), recreational vehicles (RVs), marine vessels, aircraft, and the like, can also be used.

The host vehicle 10 may correspond to a level four or level five automation system under the Society of Automotive Engineers (SAE) "J3016" standard taxonomy of automated driving levels. Using this terminology, a level four system indicates "high automation," referring to a driving mode in which the automated driving system performs aspects of the dynamic driving task, even if a human driver does not respond appropriately to a request to intervene. A level five system, on the other hand, indicates "full automation," referring to a driving mode in which the automated driving system performs aspects of the dynamic driving task under roadway and environmental conditions that can be managed by a human driver. It will be appreciated, however, the embodiments in accordance with the present subject matter are not limited to a particular taxonomy or rubric of automation categories. Furthermore, systems in accordance with the present embodiment may be used in conjunction with an autonomous or other vehicle that utilizes a navigation system and/or other systems to provide route guidance and/or implementation.

The host vehicle 10 generally includes a propulsion system 20, a transmission system 22, a steering system 24, a regenerative braking system 26, a sensor system 28, an actuator system 30, at least one data storage device 32, at least one processor 44, and a communication system 36. The propulsion system 20, the transmission system 22, and the regenerative braking system 26 are part of the powertrain of the host vehicle 10. The propulsion system 20 may include an internal combustion engine 20a, an electric machine 20b such as an electric motor/generator, a traction motor, and/or a fuel cell propulsion system. The electric machine 20b is configured to operate as an electric motor to convert electrical energy into mechanical energy (e.g., torque). Additionally, the electric machine 20b is configured to operate as an electric generator to convert mechanical energy (e.g., torque) into electrical energy. The host vehicle 10 also includes an energy storage system (ESS) 21 configured to store electrical energy. The ESS 21 is electrically connected to the electric machine 20b and therefore supplies electrical energy to the electric machine 20b. The transmission system 22 is configured to transmit power from the propulsion system 20 to the vehicle wheels 16 and 18 according to selectable speed ratios. The transmission system 22 may include a step-ratio automatic transmission, a continuously-variable transmission, or other appropriate transmission.

The host vehicle 10 further includes an exhaust system 23 in fluid communication with the internal combustion engine 20a and may include an exhaust manifold. After combustion in the internal combustion engine 20a, the exhaust system 23 receives and guides the exhaust gases produced by the internal combustion engine 20a. The exhaust system 23 may include one or more valves to guide the exhaust gases.

The host vehicle 10 further includes an intake assembly 25 for supplying air to the internal combustion engine 20a. The intake assembly 25 may include an intake manifold and is configured to receive air from the atmosphere and guide that air into the internal combustion engine 20a. The air is then mixed with fuel and combusted in the internal combustion engine 20a.

The host vehicle 10 further includes a turbocharger 27 in fluid communication with the intake assembly 25 and the exhaust system 23. Specifically, the turbocharger 27 includes a compressor 29, a turbine 31, and a shaft 33 rotatably interconnecting the compressor 29 and the turbine 31. During operation, the compressor 29 compresses the airflow before it enters internal combustion engine 20a in order to increase power and efficiency. Accordingly, the compressor 29 is in fluid communication with the intake assembly 25. The compressor 29 forces more air and, thus, more oxygen into the combustion chambers of the internal combustion engine 20a than is otherwise achievable with ambient atmospheric pressure. The compressor 29 is driven by the turbine 31 through the shaft 33. Thus, rotating the turbine 31 causes the compressor 29 to rotate. To rotate the turbine 31, exhaust gases from the exhaust system 23 are forced into the turbine 31. The buildup of exhaust gas pressure drives the turbine 31. Exhaust gas pressure when the internal combustion engine 20a is idle, operates at low engine speeds, or operates with low throttle that is usually insufficient to drive the turbine 31. When the internal combustion engine 20a reaches a sufficient speed, the turbine 31 starts to spool up (i.e., spins fast enough to produce intake pressure above atmospheric pressure). The turbocharger 27 may therefore experience "turbo lag" (which is also known as "spool time"). This turbo lag is the time between the demand for an increase in power (the throttle being opened) and the turbocharger 27 providing increased intake pressure, and hence increased power. It is therefore desirable to spool the turbocharger 27 (i.e., spins the turbine 31 fast enough to produce intake pressure above atmospheric pressure) before the host vehicle 10 has to start moving.

The regenerative braking systems 26 are coupled to the vehicle wheels 16 and 18 and are therefore configured to provide braking torque to the vehicle wheels 16 and 18. The regenerative brake system 26 is configured to reduce the vehicle speed or bring the host vehicle 10 to a stop. The regenerative braking system 26 is electrically connected to the electric machine 20b. As such, regenerative braking causes the electric machine 20b to operate as a generator to convert rotational energy from the vehicle wheels 16 and 18 to electrical power that is used to charge the energy storage system 21.

The steering system 24 influences a position of the vehicle wheels 16 and/or 18. While depicted as including a steering wheel 17 for illustrative purposes, the steering system 24 may not include a steering wheel.

The sensor system 28 includes one or more sensing devices 40a-40n that sense observable conditions of the exterior environment and/or the interior environment of the host vehicle 10. The sensing devices 40a-40n may include, but are not limited to, radars, lidars, global positioning systems, optical cameras, thermal cameras, ultrasonic sensors, and/or other sensors. For example, in the depicted embodiment, the sensing device 40a is a forward camera module (FCM) configured to capture images in the front of the host vehicle 10 and generate image data indicative of the captured images. The FCM (i.e., sensing device 40a) is in communication with the controller 34 and may therefore receive commands from the controller 34. The FCM (i.e., sensing device 40a) is also configured to send the image data to the controller 34. In the depicted embodiment, the sensing device 40b is a lidar system configured to measure the distance from the host vehicle 10 to another object, such as another vehicle. The lidar system (i.e., sensing device 40b) is in communication with the controller 34. The controller 34 may therefore receive signals from the sensing device 40b and determine the distance from the host vehicle 10 to another object based on the signal received from the sensing device 40b. The sensing device 42n may be speedometer configured to measure the current vehicle speed of the host vehicle 10. The speedometer (i.e., sensing device 40n) is in communication with the controller 34. The controller 34 is programmed to receive signals from the sensing device 40n and determine the current vehicle speed of the host vehicle 10 based on the signals received from the sensing device 40n.

The actuator system 30 includes one or more actuator devices 42a, 42b, and 42n that control one or more vehicle features of the vehicle 10. The actuator devices 42a, 42b, 42n (also referred to as the actuators 42) control one or more features such as, but not limited to, the propulsion system 20, the transmission system 22, the steering system 24, the regenerative brake system 26, and actuators for opening and closing the doors of the vehicle 10. In various embodiments, host vehicle 10 may also include interior and/or exterior vehicle features not illustrated in FIG. 1, such as a trunk, and cabin features such as air, music, lighting, touch-screen display components (such as those used in connection with navigation systems), and the like.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also, the data storage device 32 stores data pertaining to roadways on which the vehicle 10 may be travelling. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be a custom-made or commercially available processor, a central processing unit (CPU), a graphics processing unit (GPU), an auxiliary processor among several processors associated with the controller 34, a semiconductor-based microprocessor (in the form of a microchip or chip set), a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the controller 34 in controlling the host vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include a number of controllers 34 that communicate over suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in controlling maneuvers for the vehicle 10 around stationary vehicles.

Figure 2:
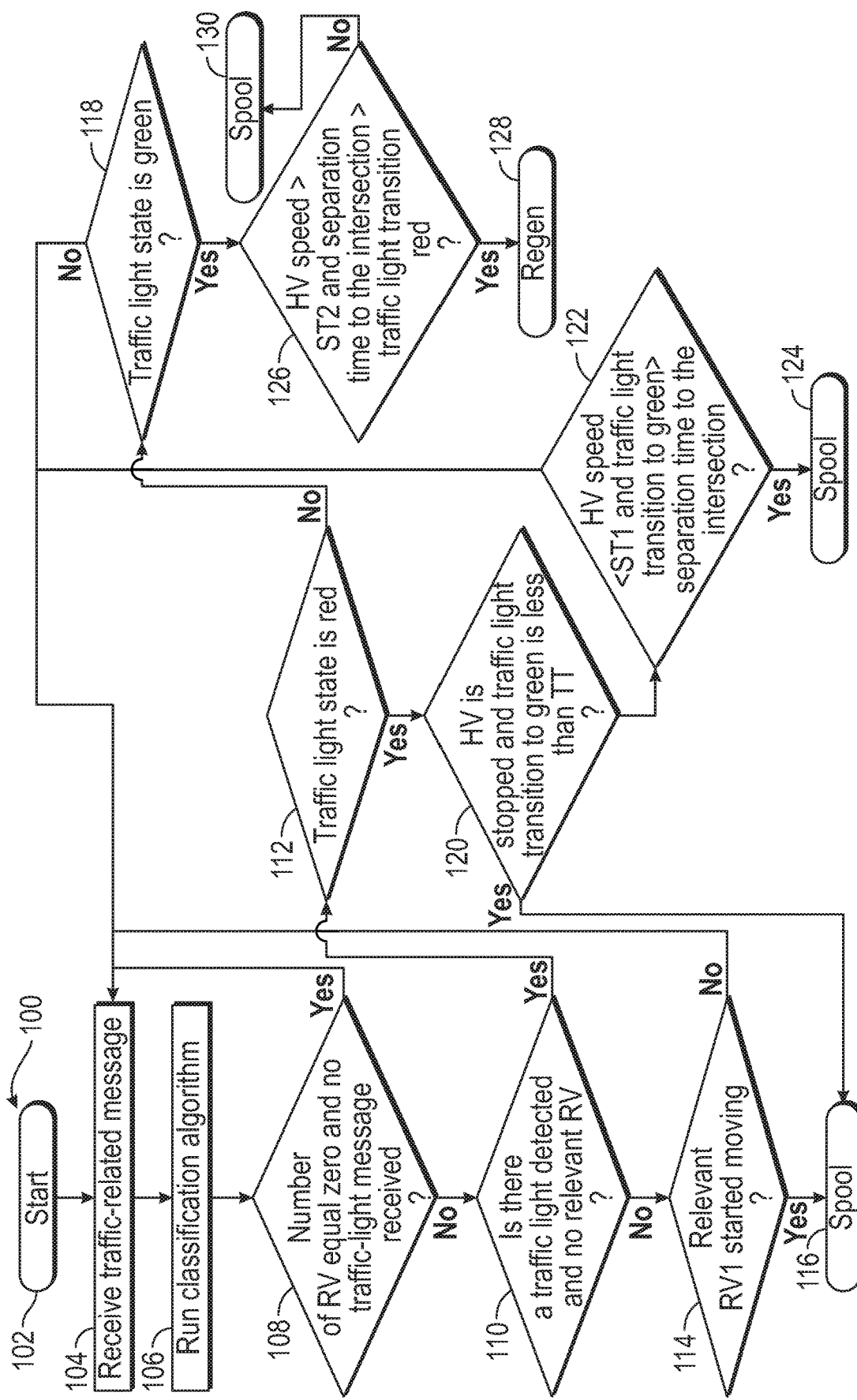
FIG. 2 is a flowchart of a method for enhancing the powertrain of the host vehicle of FIG. 1.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. The communication system 36 is configured to transmit and receive a traffic-related message as described below.

With reference to FIG. 2, a method 100 may be executed by the controller 34 to use situational awareness information in order to control the turbocharger 27 and/or the regenerative braking system 26. The method 100 begins at block 102. Next, the method 100 proceeds to block 104. At block 104, the controller 34 receives one or more traffic-related messages via the communication system 36. The traffic-related message may be a vehicle message from another vehicle and/or a traffic-light message from the traffic light. The vehicle message may be a V2V communication received from other vehicles. For example, the vehicle message may be a Basic Safety Message (BSM) as defined under SAE J2735 standard. The traffic-related messages originating from other vehicles may include data relating to that other vehicle, including, but not limited to, vehicle size, position, speed, heading, acceleration, brake system status, vehicle model, anti-lock brake status, stability control status, yaw rate, rain sensor data, wipers status data, timestamp). The vehicle position data in the traffic-related message may include latitude, longitude, and elevation. The traffic-light message may be a V2I communication from a traffic light and includes data relating to the traffic-light state (e.g., red, green, or yellow) of the traffic light and the traffic-light transition time. The traffic-light transition time is the amount of time left until the traffic light transitions from one state to another (e.g., time from red to green, time from green to yellow, and time from yellow to red). The traffic-light message may be a Signal Phase and Timing (SPaT) message generated by a traffic light as defined under SAE J2735. After block 104, the method 100 proceeds to block 106.

At block 106, the controller 34 runs a classification algorithm to determine the number of relevant vehicles RV. In the present disclosure, the term "relevant vehicles" means that vehicles that are in front of the host vehicle 10 (and behind a traffic light generating the traffic-light message) and therefore affect the movement of the host vehicle 10 toward that traffic light. Therefore, the relevant vehicles RV are usually on the same lane as the host vehicle 10. The controller 34 may be programmed to determine the number of relevant vehicles RV based on the vehicle messages (i.e., V2V communications) received from other vehicles. Alternatively (or additionally), the controller 34 may be programmed to determine the number of relevant vehicles RV based on images captured by the FCM (i.e., sensing device 40a). After block 106, the method 100 continues to block 108.

At block 108, the controller 34 determines whether the number of relevant vehicles RV is zero and no traffic-light message has been received. If the number of relevant vehicles RV is zero and no traffic-light message has been received by the controller 34, then the method 100 proceeds returns to block 104. If the number of relevant vehicles RV is greater than zero and a traffic-light message from the traffic light has been received has been received by the controller 34, then the method 100 proceeds to block 110.

At block 110, the controller 34 determines whether a traffic light has been detected based on the traffic-light message received. Also at block 110, the controller 34 determines whether there are no relevant vehicles RV. If there are no relevant vehicles RV and the traffic light has been detected, then the method 100 proceeds to block 112. If either no traffic light has been detected or a relevant vehicle RV has been identified, then the method 100 continues to block 114.

At block 114, the controller 34 determines whether a first relevant vehicle RV1 has started moving based on a vehicle message from the first relevant vehicle. The first relevant vehicle RV1 is a relevant vehicle RV that is immediately in front of the host vehicle 10. As such, no other vehicle is between the host vehicle 10 and the first relevant vehicle RV1. If the first relevant vehicle RV1 has not started moving, then the method 100 returns to block 104. If the first relevant vehicle RV1 has started moving, then the method 100 proceeds to block t.

At block 116, the controller 34 commands the internal combustion engine 20a to increase its power output to spool up the turbocharger 27. Specifically, the controller 34 command the internal combustion engine 20a to increase its power output to spin the turbine 31 fast enough to produce intake pressure above atmospheric pressure. At this moment, while the internal combustion engine 20a is increasing its power output, the vehicle host 10 is not necessarily moving. Rather, at block 116, the transmission system 22 may be in a neutral state to prevent torque transfer from the internal combustion engine 20a to the vehicle wheels 16 and 18, thereby maintaining the host vehicle 10 stationary. After spooling the turbocharger 27, the controller 34 commands the host vehicle 10 to start moving toward the traffic light.

As discussed above at block 110, if there are no relevant vehicles RV and the traffic light has been detected, then the method 100 proceeds to block 112. At block 112, the controller 34 determines whether the traffic-light state is red based on the traffic-light message 108. If the traffic-light state not is red, then the method 100 proceeds to block 118. If the traffic-light state is red, then the method 100 proceeds to block 120. At block 120, the controller 34 determines if the host vehicle 10 is stationary. Also at block 120, the controller 34 determines whether the traffic-light transition time to green is less than a predetermined time threshold TT. The predetermined time threshold TT may be determined by testing the vehicle. The term "traffic-light transition time" means the amount of time it will take the traffic light to transition from one state to another state. Therefore, at block 120, the "traffic-light transition time to green" is the amount of time from the present moment until the traffic-light state of the traffic light changes from red to green. The controller 34 is programmed to determine the traffic-light transition time to green based on the traffic-light message from the traffic light. If the host vehicle 10 is stationary and the traffic-light transition time to green is less than the predetermined time threshold TT, then the method 100 proceeds to block 116. As discussed above, at block 116, the controller 34 commands the internal combustion engine 20a to increase its power output to spool up the turbocharger 27. If either the host vehicle 10 is not stationary or the traffic-light transition time to green is equal to or greater than the predetermined time threshold TT, then the method 100 proceeds to block 122.

At block 122, the controller 34 determines the current vehicle speed of the host vehicle 10 based on signals received from the sensing device 40n (i.e., speedometer). Also, at block 122, the controller 34 determines whether the current vehicle speed of the host vehicle 10 is less than a first predetermined speed threshold ST1. The first predetermined speed threshold ST1 may be determined by testing the host vehicle 10. Also, at block 122, the controller 34 determines whether the traffic-light transition time to green is less than a separation time to the intersection (hereinafter referred to as the "separation time"). As discussed above, the "traffic-light transition time to green" is an amount of time from a present moment until the traffic-light state of the traffic light changes from red to green. The "separation time" is an amount of time that the host vehicle 10 will take, at its current vehicle speed, to reach the intersection in which the traffic light is located. The controller 34 determines the separation time at block 122. To do so, the controller 34 determines the distance from its current position to the intersection where the traffic light is located, for example, based on signals received from the lidar system (i.e., sensing device 40b). Therefore, at block 122, the controller 34 commands the lidar system (i.e., sensing device 40b) to measure the distance from the current location of the host vehicle 10 to the intersection in which the traffic light is located. Then, the controller 34 divides this measured distance by the current vehicle speed to determine the separation time. If the current vehicle speed of the host vehicle 10 is less than the predetermined speed threshold ST1 and the traffic-light transition time to green is greater than the separation time, then it means that the host vehicle 10 will make the green light by the time it reaches the intersection and spooling is desirable in this situation. Thus, if the current vehicle speed of the host vehicle 10 is less than the predetermined speed threshold ST1 and the traffic-light transition time to green is greater than the separation time, then the method 100 continues to block 124.

Block 124 may be identical to block 116. In other words, at block 124, the controller 34 commands the internal combustion engine 20a to increase its power output to spool up the turbocharger 27. If either the current vehicle speed of the host vehicle 10 is equal to or greater than the predetermined speed threshold ST1 or the traffic-light transition time to green is equal to or less than the separation time, then the method 100 returns to block 104.

As discussed above with respect to block 112, if the traffic-light state is not red, then the method 100 continues to block 118. At block 118, the controller 34 determines whether the traffic-light state is green based on the traffic-light message received from the traffic light. If the controller 34 determines that the traffic-light state of the traffic light is green, then the method 100 continues to block 126. At block 126, the controller 34 determines the current vehicle speed of the host vehicle 10 as discussed above with respect to block 122. Also at block 126, the controller 34 determines whether a current vehicle speed of the host vehicle 10 is greater than a second predetermined speed threshold ST2. The second predetermined speed threshold may be determined by testing the host vehicle 10. Also, at block 126, the controller 34 determines whether a traffic-light transition time to red is greater than a separation time. The traffic-light transition time to red is an amount of time from the present moment until the traffic-light state changes from red to green. The controller 34 is programmed to determine the traffic-light transition time to red based on the traffic-light message received from the traffic light. Also, at block 126, the controller 34 determines the separation time to the intersection in which the traffic light is located ("separation time") as discussed above with respect to block 122. Also, at block 126, the controller 34 determines whether the traffic-light transition time to green is less than a separation time to the intersection (hereinafter referred to as the "separation time"). As discussed above, the "separation time" is an amount of time that the host vehicle 10 will take, at its current vehicle speed, to reach the intersection in which the traffic light is located. Also, at block 126, the controller 34 determines whether the separation time is greater than the traffic-light transition time to red. If the current vehicle speed of the host vehicle 10 is greater than the second predetermined speed threshold ST2 and the separation time is greater than the traffic-light transition time to red, then it means that the host vehicle 10 will not make it to the intersection by the time the traffic light changes to green, thereby making deceleration desirable. Thus, if the current vehicle speed of the host vehicle 10 is greater than the second predetermined speed threshold ST2 and the separation time is greater than the traffic-light transition time to red, then the method 100 proceeds to block 128.

At block 128, the controller 34 commands the regenerative braking system to actuate in order to decelerate the host vehicle 10 and simultaneously electrically charge the energy storage system 21. If either current vehicle speed of the host vehicle 10 is equal to or less than the second predetermined speed threshold ST2 or the separation time is equal to or less than the traffic-light transition time to red, then the method 100 proceeds to block 130. Block 130 may be identical to block 116. In other words, at block 130, the controller 34 commands the internal combustion engine 20a to increase its power output to spool up the turbocharger 27.

Figure 3:
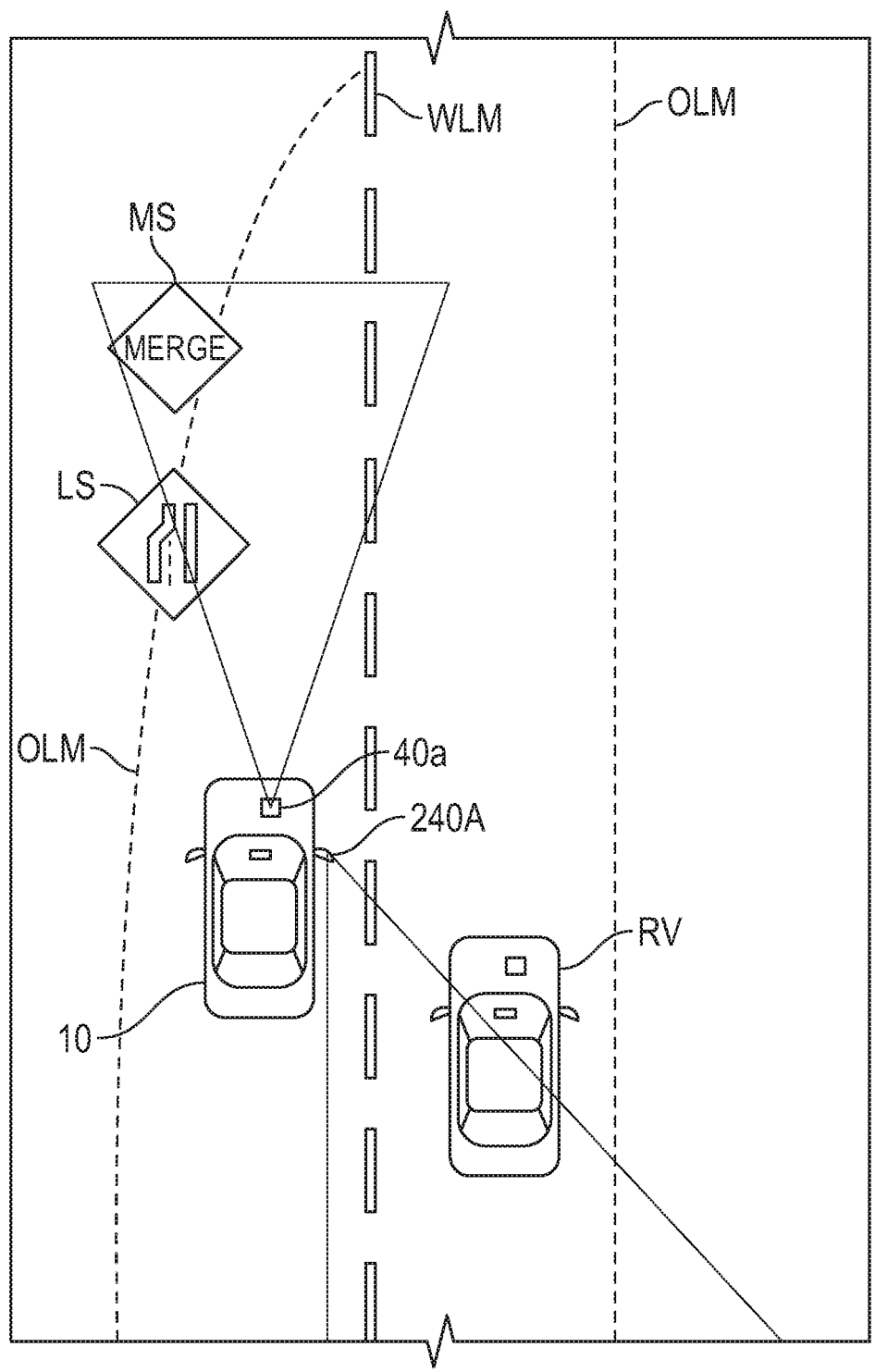
FIG. 3 is a schematic illustration, showing the host vehicle of FIG. 1 merging lanes.

FIG. 3 schematically illustrates the host vehicle 10 merging into a lane. In this embodiment, the sensing device 40a is the FCM that is configured to capture images in front of the host vehicle 10. The sensing device 40a (i.e., FCM) is configured to detect a merge sign MS, a lane ends sign LES, and/or wider lane markings (in comparison with the other lane markings). The sensing device 40n may be another camera or a lidar system to detect the presence of a relevant vehicle RV in an adjacent lane.

Figure 4:
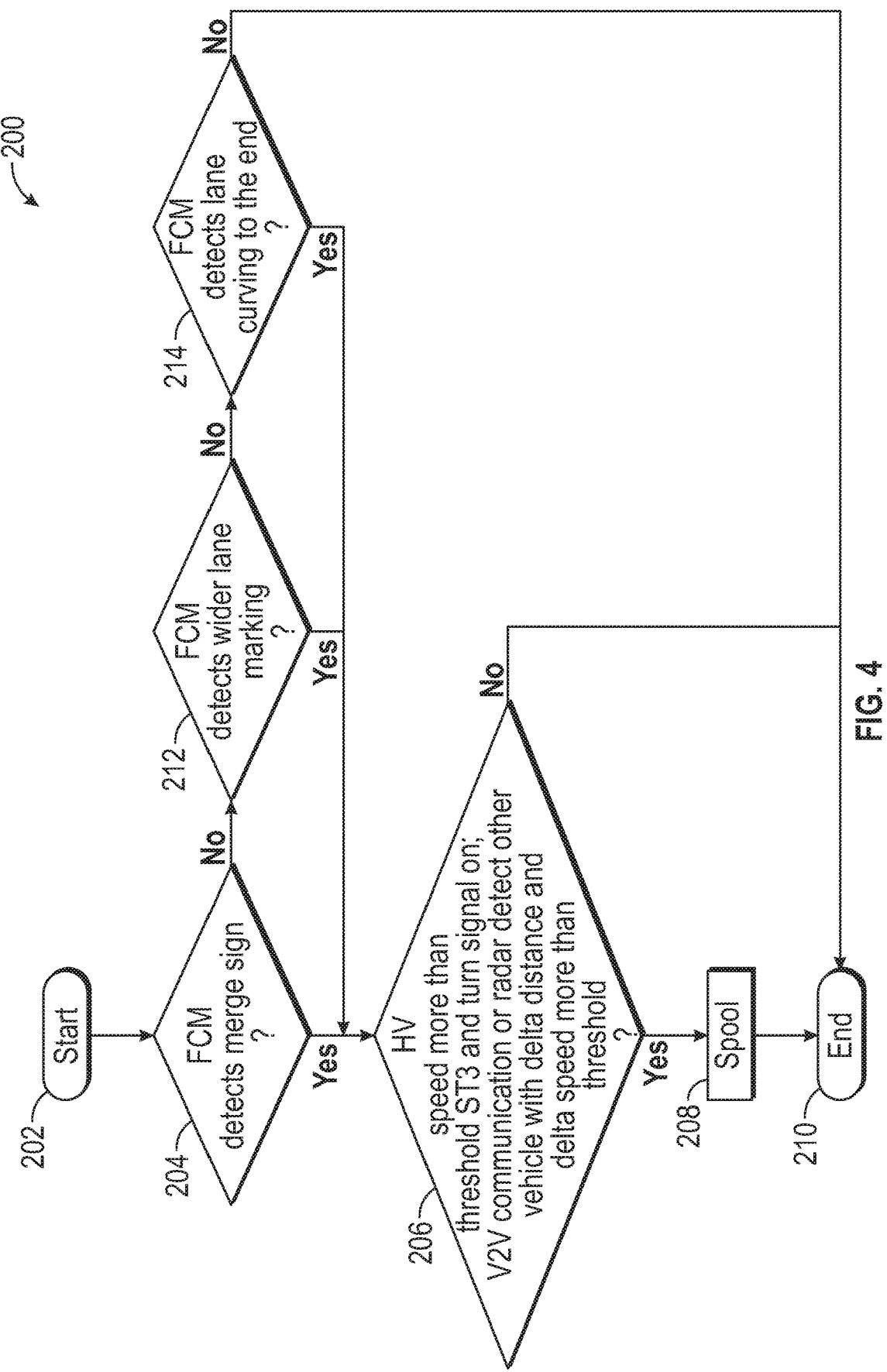
FIG. 4 is a flowchart of a method for controlling the host vehicle of FIG. 1 while it merges lanes.

FIG. 4 is a flowchart of a method 200 for controlling the host vehicle 10 while merging into another lane. The method 200 begins at block 202. Then, the method 200 proceeds to block 204. At block 204, the FCM (i.e., sensing device 40a) detects the merge sign MS. In other words, at block 204, the controller 34 determines whether the the merge sign MS is detected based on the image data received from the FCM (i.e., sensor device 40a). If the FCM does detects the merger sign MS, then the method 200 proceeds to block 206. At block 206, the controller 34 determines whether the current vehicle speed of the host vehicle 10 (HV) is greater than a third speed threshold ST3. Also, at block 206, the controller 34 determines whether the turn signal of the host vehicle 10 is activated (i.e., on). Also, at block 206, the controller 34 determines whether another relevant vehicle RV is detected using V2V communication through the communication system 36 and/or a radar system, such as the lidar system (i.e., sensing device 40n). In addition, the controller 34 determines the delta distance and the delta speed between the relevant vehicle RV and the host vehicle 10. The "delta distance" is the distance from the host vehicle 10 and the relevant vehicle RV. The "delta speed" is the difference in speed between the host vehicle 10 and the relevant vehicle RV. The lidar system (i.e., sensing device 40n) may directly or indirectly determine the delta distance and/or the delta speed. The controller 34 determines whether the delta distance is greater than a predetermined distance threshold. Also, the controller 34 determines whether the delta speed is greater than the third predetermined speed ST3. The controller 34 determines whether the delta distance is greater than a predetermined distance threshold. Also at block 206, the controller 34 determines whether the delta speed is greater than a fourth predetermined speed threshold. If the current vehicle speed of the host vehicle 10 is greater than the third predetermined speed threshold ST3, the delta distance is greater than the predetermined distance threshold, and the delta speed is greater than the fourth predetermined speed threshold, then the method 200 proceeds to block 208. Block 208 is identical to block 116. Thus, at block 208, the controller 34 commands the internal combustion engine 20a to increase its power output to spool up the turbocharger 27. Then, the method 200 proceeds to block 210, where the method 200 ends.

If, at block 204, the controller 34 determines that the FCM (i.e., sensing device 40a) does not detect the merger sign MS, then the method 200 proceeds to block 212. At block 212, the controller 34 (via the FCM) determines whether the FCM (i.e., sensing device 40a) detected the wider margin lane WLM (in comparison with the other marking lanes OM). If the FMC detected the wider marking lanes WML, then the method 200 proceeds to block 206. If the FCM did not detect the wider marking lanes WML, then the method 200 proceeds to block 214. At block 214, the controller 34 determines (via the FCM) whether the lane is curving to an end. If the controller 34 determines that the lane is curving to an end, then the method 200 proceeds to block 206. If the controller 34 does not determine that the lane is curving to an end, then the method 200 proceeds to the block 210.

Figure 5:
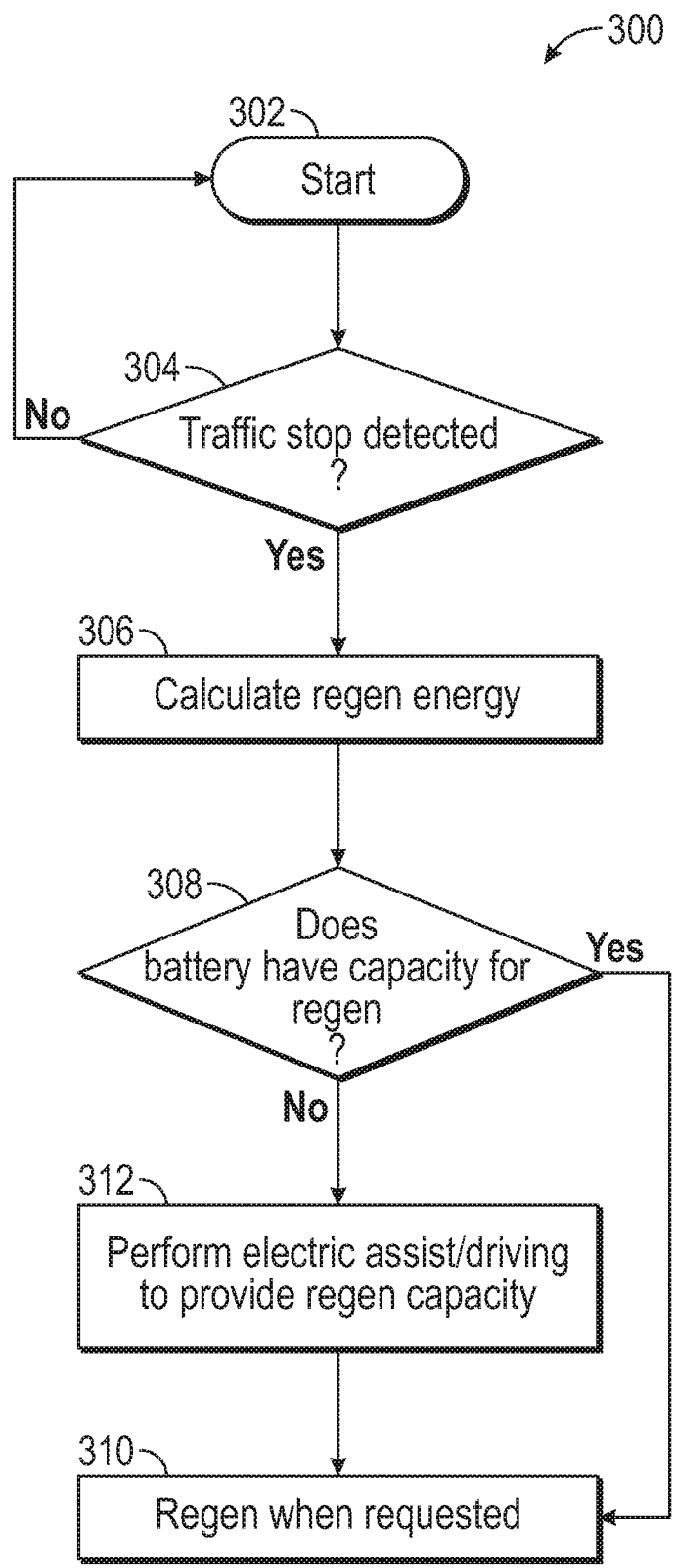
FIG. 5 is a flowchart of a method for controlling the regenerative braking system of the host vehicle of FIG. 1.

FIG. 5 is a flowchart of a method for controlling the regenerative braking system 26 of the host vehicle 10. The method 300 begins at block 302. Then, the method 300 proceeds to block 304. At block 304, the controller 34 determines whether a traffic stop is detected based on the traffic-related message. If no traffic stop is detected, then the method 300 returns to block 302. If the traffic stop is detected, then the method 300 proceeds to block 306. At block 306, the controller 36 calculates the regenerative energy to be produced by the regenerative braking system 26. To do so, the controller 34 determines the maximum energy capacity of the energy storage system 21. The maximum energy capacity of the energy storage system 21 takes into consideration the state of charge of the energy storage system 21. The maximum energy available for regeneration is the host vehicle's kinetic energy, which may be expressed with the following equation:

$$E_{tot}=1/2mv^2$$

where:
$E_{tot}$ is the kinetic energy of the host vehicle 10;
m is the mass of the host vehicle 10;
v is the velocity of the host vehicle 10.

The kinetic energy of the host vehicle 10 is a good estimate for the regenerative energy available since stopping the host vehicle 10 requests dissipation of all of the kinetic energy. This energy can be refined, however, because the host vehicle 10 losses some of its energy to: 1) change in potential energy; and 2) various parasitic losses. Therefore, the following equation defines the refined maximum regenerative energy as follows:

$$E_{regen}=E_{tot}-E\Delta_{PE}-E_{losses}$$

where:
$E_{regen}$ is the refined regenerative energy available;
$E_{tot}$ is the kinetic energy of the host vehicle 10;
$E\Delta_{PE}$ is the change in potential energy; and $E_{losses}$ is the energy losses.

The change in potential energy may be expressed by the following equation:

$$E\Delta_{PE}=mg(h_{current}-h_{stop})=mg\Delta h;$$

$E\Delta_{Pe}$ is the change in potential energy;
m is the mass of the host vehicle 10;
g is the acceleration of gravity;
$h_{current}$ is the current height of the host vehicle 10;
$h_{stop}$ is the height of the host vehicle 10 at a stopping location; and
$\Delta h$ the difference between the $h_{current}$ and the $h_{stop}$.

The controller 34 may use a high definition map to calculate the $\Delta h$. The current height may be set to zero if the map information is not available. The controller 34 may consider additional losses, such as rolling resistance, driveline losses (e.g., rotational frictions, engine pump losses, etc.). After block 306, the method 300 proceeds to block 308. At block 308, the controller 34 determines whether the energy storage system 21 has enough capacity to receive the regenerative energy produced by the regenerative braking system 26. If the energy storage system 21 has capacity to receive the regenerative energy produced by the regenerative braking system 26, then the method proceeds to block 310. At block 310, the controller 34 commands the regenerative braking system 26 to actuate in order to decelerate the host vehicle 10 and simultaneously electrically charge the energy storage system 21 (i.e., supply electrical energy to the energy storage system 21). If the energy storage system 21 does not have enough capacity to receive the regenerative energy produced by the regenerative braking system 26, then the method proceeds to block 312. At block 312, the controller 34 commands the electric machine 20b to consume electrical energy from the energy storage system 21 for propulsion, for example, until the maximum energy storage capacity of the energy storage system 21 is equal to or greater than the expected regenerative energy produced by the regenerative braking system 26. Stated differently, at block 312, the controller 34 commands the energy storage system 21 to supply electrical energy to the electric machine 20b until the maximum energy storage capacity of the energy storage system 21 is equal to or greater than the regenerative energy produced by the regenerative braking system 26. In response, the electric machine 20b converts the supplied electrical energy into mechanical energy (i.e., torque) for propulsion. The consumed electrical energy is used for electric assist and/or driving.

Figure 6:
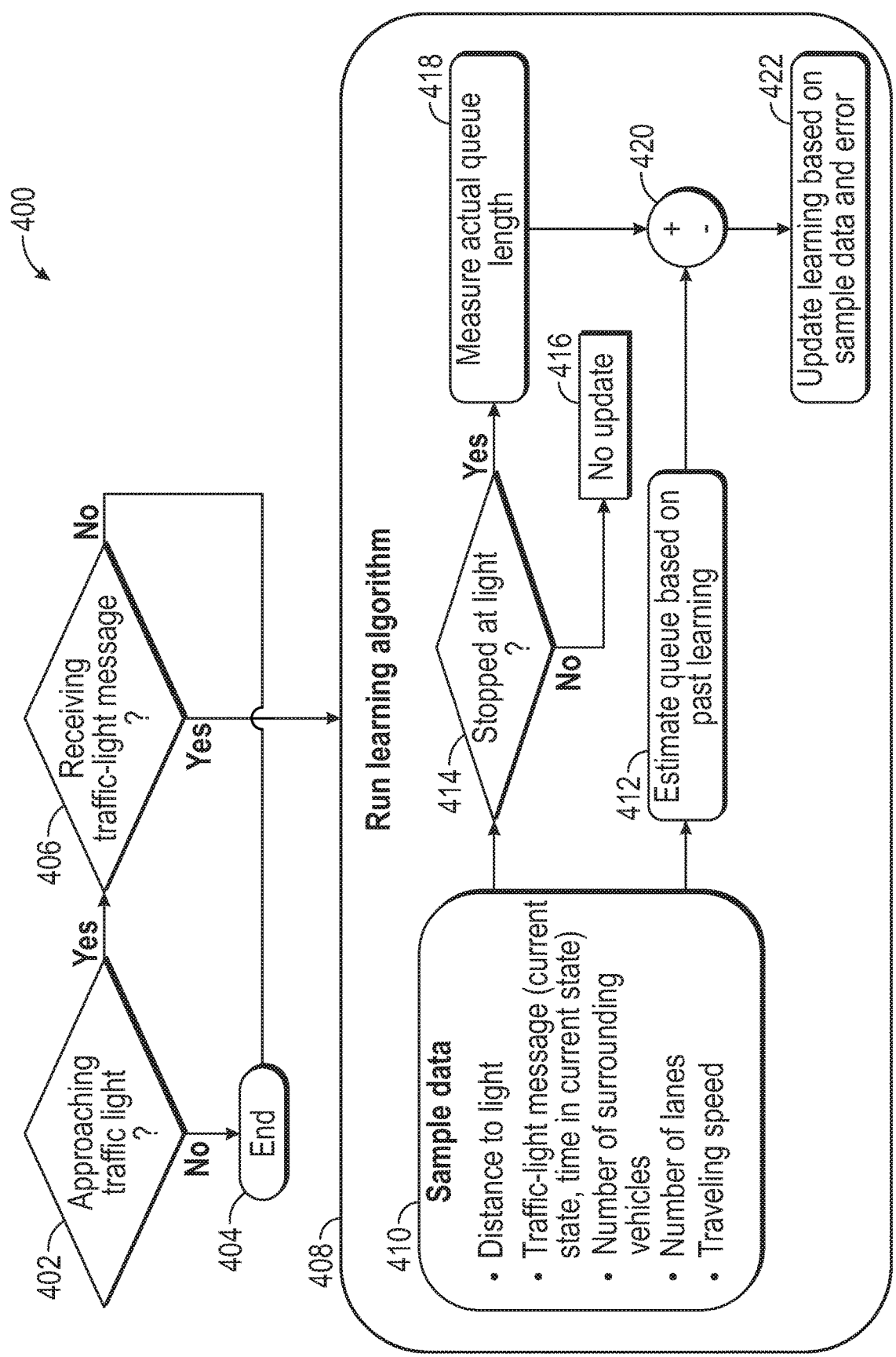
FIG. 6 is a flowchart of a method for estimating the traffic queue length using artificial intelligence.

FIG. 6 is a flowchart of a method for estimating the traffic queue length from the host vehicle 10 to a traffic light. It is desirable to estimate this traffic queue length, because the determination of whether the host vehicle 10 stops at the intersection depends on both the traffic-light state and the traffic queue length. Although the traffic queue length is dynamic, it is capable of being estimated using artificial intelligence based on a perceived density and speed of the vehicles surrounding the host vehicle 10 (i.e., the surrounding vehicles). The traffic queue length may be determined using a neural network that takes into consideration the distance from the host vehicle 10 to the traffic light, the traffic-light message, the number of surrounding vehicles (e.g., number of relevant vehicles RV), the number of lanes, and traveling speed of the surrounding vehicles. The host vehicle 10 may also employ spooling and regenerative braking control to upshift and downshift the transmission system 22.

The method 400 begins at block 402, in which the controller 34 determines whether the host vehicle 10 is approaching a traffic light based on a traffic-light message received from the traffic light and/or image data received from the FCM (i.e., sensing device 40a). If the host vehicle 10 is not approaching a traffic light, then the method 400 proceeds to block 404, where the method 400 ends. If the host vehicle 10 is approaching a traffic light, then the method 400 proceeds to block 406. At block 406, the controller 34 determines whether the traffic-light message (e.g., SPaT) has been received. As discussed above, the traffic-light message may be a V2I communication from the traffic light and includes data relating to the traffic-light state (e.g., red, green, or yellow) of the traffic light and the traffic-light transition time. If no traffic-light message has been received by the controller 34, then the method 400 proceeds to block 404, where the method 400 ends. If a traffic-light message has been received by the controller 34, then the method 400 executes a run learning algorithm 408.

The run learning algorithm includes a step 410, which entails receiving and processing sample data. The sample data includes, but not limited to, the distance from the host vehicle 10 to the traffic light (obtained, for example, from the lidar system (i.e., sensing device 40b)), traffic-light message (including the current traffic-light state and the time in the current state), the number of surrounding vehicles (e.g., number of relevant vehicles RV, which may be obtained from V2V communications), number of lanes (which may be obtained from the FCM (i.e., sensing device 40a)), and the traveling speed of the surrounding vehicles. After step 410, the run learning algorithm proceeds to step 412. At step 412, the controller 34 estimates the traffic queue length based on past learning. After step 410, the run learning algorithm proceeds to step 414. At step 414, the controller 34 determines whether the host vehicle 10 is stopped at the traffic light. If the host vehicle 10 is not stopped at the traffic light, then the run learning algorithm proceeds to step 416. At step 416, the controller 34 determines that no update of the past learning is performed. In other words, no training is performed. If the host vehicle 10 is stopped at the traffic light, then the run learning algorithm proceeds to step 418. At step 418, the controller 34 determines the actual traffic queue length by measuring it. The lidar system (i.e., sensing device 40b) and/or the FCM (i.e., sensing device 40a) may be used to take an actual measurement of the traffic queue length. After step 418, the run learning algorithm proceeds to step 420. At step 420, the controller 34 determines (i.e., calculates) the difference (i.e., the error) between the traffic queue length estimated using artificial intelligence (at step 412) and the traffic queue length measured using the lidar system (i.e., sensing device 40b) and/or the FCM (i.e., sensing device 40a). After step 420, the run learning algorithm proceeds to step 422. At step 422, the controller 34 updates the learning based on the sample data and the error.

While the best modes for carrying out the teachings have been described in detail, those familiar with the art to which this disclosure relates will recognize various alternative designs and embodiments for practicing the teachings within the scope of the appended claims. The host vehicle 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

The invention claimed is:

1. A host vehicle, comprising:
an internal combustion engine;
a turbocharger in fluid communication with the internal combustion engine;
a communication system configured to transmit and receive a traffic-related message; and
a controller in communication with the turbocharger and the communication system, wherein the controller is programmed to:
receive the traffic-related message via the communication system; and
command the internal combustion engine to increase a power output of the internal combustion engine to spool up the turbocharger in response to receiving the traffic-related message;
wherein the controller is programmed to determine a number of relevant vehicles, and the number of relevant vehicles is a number of vehicles that are in front of the host vehicle and behind a traffic light and affect a movement of the host vehicle toward the traffic light.

2. A host vehicle, comprising:
an electric machine;
an energy storage system electrically connected to the electric machine;
a regenerative braking system electrically connected to the electric machine;
a communication system configured to transmit and receive a traffic-related message; and
a controller in communication with the communication system, wherein the controller is programmed to:
receive the traffic-related message via the communication system;
in response to receiving the traffic-related message, control the regenerative braking system to electrically charge the energy storage system;
detect a traffic stop based on the traffic-related message;
calculate a regeneration energy to be produced by the regenerative braking system based on a vehicle speed of the host vehicle and a vehicle mass of the host vehicle;
determine that the energy storage system does not have a capacity to receive the regenerative energy; and
in response to determining that the energy storage system does not have the capacity to receive the regeneration energy, command the energy storage system to supply electrical energy to the electric machine to propel the host vehicle.

3. The host vehicle of claim 1, wherein the traffic-related message is a one of a vehicle message from one of the relevant vehicles and a traffic-light message from the traffic light.

4. The host vehicle of claim 3, wherein the controller is programmed to determine that the number of relevant vehicles is greater than zero and that the traffic-light message has been received from the traffic light.

5. The host vehicle of claim 4, wherein the controller is programmed to determine that a first one of the relevant vehicles is moving based on the vehicle message, and the first one of the relevant vehicles is immediately in front of the host vehicle.

6. The host vehicle of claim 5, wherein the controller is programmed to command the internal combustion engine to increase an output power of the internal combustion engine to spool up the turbocharger in response to determining that the first one of the relevant vehicles is moving based on the vehicle message or to spin an electric machine attached to the turbocharger to spool up the turbocharger.

7. The host vehicle of claim 4, wherein the controller is programmed to detect the traffic light based on the traffic-light message and to determine the number of relevant vehicles is zero, and the controller is programmed to determine that a traffic-light state of the traffic light is red based on the traffic-light message.

8. The host vehicle of claim 7, wherein, in response to determining that the traffic-light state of the traffic light is red, the controller is programmed to:
  determine that the host vehicle is stationary;
  determine that a traffic-light transition time to green is less than a predetermined time threshold; and
  wherein the traffic-light transition time to green is an amount of time until the traffic-light state changes from red to green.

9. The host vehicle of claim 8, wherein, in response to determining that the host vehicle is stationary and that the traffic-light transition time to green is less than the predetermined time threshold, the controller is programmed to command the internal combustion engine to increase a power output of the internal combustion engine to spool up the turbocharger.

10. The host vehicle of claim 7, wherein, in response to determining that the traffic-light state of the traffic light is red, the controller is programmed to:
  determine that the host vehicle is not stationary;
  determine that a traffic-light transition time to green is equal to or greater than a predetermined time threshold; and
  wherein the traffic-light transition time to green is an amount of time until the traffic-light state changes from red to green;
  in response to determining that the host vehicle is not stationary and that the traffic-light transition time to green is equal to or greater than the predetermined time threshold, the controller is programmed to:
    determine that a current vehicle speed of the host vehicle is less than a predetermined speed threshold;
    determine that a traffic-light transition time to green is greater than a separation time;
  wherein the traffic-light transition time to green is an amount of time until the traffic-light state changes from red to green; and
  wherein the separation time is an amount of time that the host vehicle will take, at the current vehicle speed, to reach an intersection in which the traffic light is located.

11. The host vehicle of claim 10, in response to determining that the current vehicle speed of the host vehicle is less than the predetermined speed threshold and determining that the traffic-light transition time to green is greater than the separation time, the controller is programmed to command the internal combustion engine to increase a power output of the internal combustion engine to spool up the turbocharger.

12. The host vehicle of claim 4, wherein:
  the controller is programmed to detect the traffic light based on the traffic-light message and to determine the number of relevant vehicles is zero;
  the controller is programmed to determine that a traffic-light state of the traffic light is green based on the traffic-light message; and
  in response to determining that the traffic-light state of the traffic light is green, the controller is programmed to:
    determine that a current vehicle speed of the host vehicle is greater than a predetermined speed threshold;
    determine that a traffic-light transition time to red is greater than a separation time;
  wherein the traffic-light transition time to red is an amount of time until the traffic-light state of the traffic light changes from green to red; and
  wherein the separation time is an amount of time that the host vehicle will take, at the current vehicle speed, to reach an intersection in which the traffic light is located.

13. The host vehicle of claim 12, further comprising an electric machine, a regenerative braking system coupled to the electric machine, and an energy storage system electrically connected to the electric machine; and
  wherein, in response to determining that the current vehicle speed of the host vehicle is greater than the predetermined speed threshold and that the traffic-light transition time is greater than the separation time, the controller is programmed to actuate the regenerative braking system to electrically charge the energy storage system.

14. The host vehicle of claim 11, wherein:
  the controller is programmed to determine that a traffic-light state of the traffic light is green;
  in response to determining that the traffic-light state of the traffic light is green, the controller is programmed to:
    determine that a current vehicle speed of the host vehicle is less than a predetermined speed threshold; and
    determine that a traffic-light transition time is less than a separation time;
  wherein the traffic-light transition time is an amount of time until the traffic-light state changes from red to green;
  wherein the separation time is an amount of time that the host vehicle will take to reach an intersection in which the traffic light is located at the current vehicle speed; and
  wherein, in response to determining that the current vehicle speed of the host vehicle is less than the predetermined speed threshold and that the traffic-light transition time is less than the separation time, the controller is programmed to command the internal combustion engine to increase a power output of the internal combustion engine to spool up the turbocharger.

15. The host vehicle of claim 1, further comprising a forward camera module configured to capture images and generate image data, wherein the forward camera module is in communication with the controller, wherein the controller is programmed to:
  determine that a lane ends based on the image data received from the forward camera module; and
  in response to determining that the lane ends, command the internal combustion engine to increase a power output of the internal combustion engine to spool up the turbocharger.

16. The host vehicle of claim 1, wherein the controller is programmed to estimate a traffic queue length using artificial intelligence.

17. The host vehicle of claim 2, wherein the controller is programmed to:
after supplying electrical energy from the energy storage system to the electric machine, command the regenerative braking system to supply electrical energy to the energy storage system.

18. The host vehicle of claim 17, wherein:
the energy storage system has a maximum energy capacity taking into consideration a state of charge of the energy storage system;
the energy storage system supplies electrical energy to the electric machine until the maximum energy storage capacity is equal to or greater than the regeneration energy; and
the controller commands the regenerative braking system to supply electrical energy to the energy storage system after the maximum energy capacity is equal to or greater than the regenerative energy.

* * * * *